US012624192B2

(12) United States Patent
Wang

(10) Patent No.: US 12,624,192 B2
(45) Date of Patent: May 12, 2026

(54) ELECTRO-POLARIZABLE PARTICLE, PREPARATION METHOD THEREOF, AND ELECTRO-POLARIZABLE ALLOCHROIC OPTICAL FILM

(71) Applicant: SHAOXING DIFEI NEW MATERIAL CO., LTD., Shaoxing (CN)

(72) Inventor: Pengfei Wang, Shaoxing (CN)

(73) Assignee: SHAOXING DIFEI NEW MATERIAL CO., LTD., Shaoxing (CN)

( * ) Notice: Subject to any disclaimer, the term of this patent is extended or adjusted under 35 U.S.C. 154(b) by 691 days.

(21) Appl. No.: 17/878,158

(22) Filed: Aug. 1, 2022

(65) Prior Publication Data

US 2022/0380570 A1 Dec. 1, 2022

Related U.S. Application Data

(63) Continuation of application No. PCT/CN2022/075889, filed on Feb. 10, 2022.

(30) Foreign Application Priority Data

Apr. 13, 2021 (CN) ......................... 202110395672.7

(51) Int. Cl.
*C08K 3/16* (2006.01)
*C08J 5/18* (2006.01)
*G02F 1/01* (2006.01)

(52) U.S. Cl.
CPC .................. *C08K 3/16* (2013.01); *C08J 5/18* (2013.01); *G02F 1/0136* (2013.01);
(Continued)

(58) Field of Classification Search
None
See application file for complete search history.

(56) References Cited

U.S. PATENT DOCUMENTS

2011/0267714 A1* 11/2011 Makino ................ C07D 471/04 359/892
2012/0307348 A1* 12/2012 Nomura ................. G02F 1/172 359/296
2021/0198565 A1* 7/2021 Li ........................... G02F 1/172

FOREIGN PATENT DOCUMENTS

CN 109491174 A 3/2019
CN 110824802 A 2/2020
(Continued)

OTHER PUBLICATIONS

International Search Report Cited in PCT/CN2022/075889, Apr. 28, 2022; 4 Pages.
(Continued)

*Primary Examiner* — Samir Shah
(74) *Attorney, Agent, or Firm* — Cooper Legal Group, LLC

(57) ABSTRACT

The present application relates to electro-polarizable particle, a preparation method thereof and an electro-polarizable allochroic optical film, belonging to the technical field of electro-polarizable allochroic optical film devices. The present application discloses electro-polarizable particle, whose raw materials include a metal iodide, a carboxylic acid nitrogenous organic molecule, iodine and a cellulose suspending agent; the electro-polarizable particle have a rod-shaped structure, a length of 100-2000 nm, and a width of 10-200 nm. The present application further discloses a preparation method for electro-polarizable particle, and also discloses an electro-polarizable allochroic optical film containing the electro-polarizable particle.

7 Claims, 6 Drawing Sheets

(52) U.S. Cl.
CPC ........ *C08J 2325/14* (2013.01); *C08J 2333/08* (2013.01); *C08J 2383/04* (2013.01); *C08K 2003/162* (2013.01); *C08K 2003/166* (2013.01)

(56) References Cited

FOREIGN PATENT DOCUMENTS

| | | | |
|---|---|---|---|
| CN | 111323980 | A | 6/2020 |
| CN | 111679455 | A | 9/2020 |
| CN | 111718450 | A | 9/2020 |
| CN | 111752013 | A | 10/2020 |
| CN | 113105351 | A | 7/2021 |
| KR | 20210037719 | A | 4/2021 |
| WO | 2011132549 | A1 | 10/2011 |

OTHER PUBLICATIONS

Office Action received in corresponding Korean patent application No. 10-2023-7007974, dated May 2, 2025, 90 pages.

* cited by examiner

GPC results

| | Distribution name | Mn (Dalton) | Mw (Dalton) | MP | Mz (Dalton) | Mz+1 (Dalton) | Polydispersity | MW Tag 1 (Dalton) | MW Tag 2 (Dalton) |
|---|---|---|---|---|---|---|---|---|---|
| 1 | | 4785 | 5845 | 4029 | 7530 | 9956 | 1.221414 | | |

GPC results

| | Distribution name | Mn (Dalton) | Mw (Dalton) | MP | Mz (Dalton) | Mz+1 (Dalton) | Polydispersity | MW Tag 1 (Dalton) | MW Tag 2 (Dalton) |
|---|---|---|---|---|---|---|---|---|---|
| 1 | | 4223 | 4818 | 3328 | 5657 | 6755 | 1.140900 | | |

GPC results

| | Distribution name | Mn (Dalton) | Mw (Dalton) | MP | Mz (Dalton) | Mz+1 (Dalton) | Polydispersity | MW Tag 1 (Dalton) | MW Tag 2 (Dalton) |
|---|---|---|---|---|---|---|---|---|---|
| 1 | | 12630 | 15714 | 7746 | 19983 | 25164 | 1.244178 | | |

GPC results

| | Distribution name | Mn (Dalton) | Mw (Dalton) | MP | Mz (Dalton) | Mz+1 (Dalton) | Polydispersity | MW Tag 1 (Dalton) | MW Tag 2 (Dalton) |
|---|---|---|---|---|---|---|---|---|---|
| 1 | | 10008 | 11300 | | 13087 | 15331 | 1.129055 | | |

ELECTRO-POLARIZABLE PARTICLE, PREPARATION METHOD THEREOF, AND ELECTRO-POLARIZABLE ALLOCHROIC OPTICAL FILM

CROSS-REFERENCE TO RELATED APPLICATION

This application is a continuation of international PCT application No. PCT/CN2022/075889, filed on Feb. 10, 2022, which claims a priority and benefit of China patent application No. 202110395672.7, filed on Apr. 13, 2021. The entireties of international PCT application No. PCT/CN2022/075889 and China patent application No. 202110395672.7 are hereby incorporated by reference herein and made a part of this specification.

TECHNICAL FIELD

The present application relates to the field of electro-polarizable allochroic optical film devices, and in particular, to an electro-polarizable particle, a preparation method thereof, and an electro-polarizable allochroic optical film.

BACKGROUND ART

Electrochromic glass (film) is widely used in smart home, office partition, architecture, automobile, high-speed railway and other fields due to its numerous functions, such as shading, heat insulation, energy saving, privacy protection and so on. It has great social significance and commercial value. Electrochromic technology has been developed for a long time and is very challenging.

At present, there are two kinds of smart glasses based on electrochromic technology in the market: smart glasses based on polymer dispersed liquid crystal (PDLC) and smart glasses based on conductive polymer electrochromic (EC). Polymer dispersed liquid crystal (PDLC) technology is to disperse micron sized liquid crystal small molecule micro-droplets in the organic solid polymer matrix. By adjusting the voltage, it can realize the transformation from hazy and opaque state to transparent state. However, PDLC smart glass has no shading property, narrow visible light transmittance range, unsatisfactory energy-saving effect, and limited application scenarios. Conductive polymer electrochromic (EC) technology can achieve a wider transmittance range compared with PDLC, and has good shading and energy-saving effects. However, it has complex processing technology, slow allochroic speed, short service life, high cost and high price. It is only used in a few devices such as upmarket sports cars and Boeing aircraft.

The electro-polarizable particle is an organic-inorganic hybrid particle with a certain shape. The organic-inorganic hybrid particle is anisotropic and can be polarized and deflected under electric field (magnetic field). After being made into a device, it shows the allochroic function. The devices made of the electro-polarizable particle have characteristics such as wide transmittance range and fast discoloration, and have a wide application prospect, but there are few reports in China.

SUMMARY

In order to obtain an electro-polarizable allochroic optical film device with wide transmittance range and fast discoloration, the present application provides an electro-polarizable particle, a preparation method thereof, and an electro-polarizable allochroic optical film.

In a first aspect, the present application provides an electro-polarizable particle, which adopt the following technical solution:

an electro-polarizable particle, including a metal iodide, a carboxylic acid nitrogenous organic molecule, iodine and a cellulose suspending agent;

the electro-polarizable particle have a rod-shaped structure, a length of 100-2000 nm, and a width of 10-200 nm.

In a second aspect, the present application provides a preparation method for an electro-polarizable particle, which adopts the following technical solution:

a preparation method for an electro-polarizable particle, including the following steps:

1) adding a cellulose suspending agent to a solvent under stirring, raising a reaction temperature to 25-80° C., then successively adding iodine, a carboxylic acid nitrogenous organic molecules, a metal iodide, a fatty alcohol and deionized water, and continuing reacting at 25-80° C. for 1-20 h;

2) a resultant from step 1) is centrifuged and washed, and a precipitate is dispersed into the solvent to obtain the dispersion liquid of the electro-polarizable particle.

In some embodiments, the solvent is ethyl acetate.

In some embodiments, the cellulose suspending agent is one or more selected from the group consisting of ethyl cellulose, cellulose acetate, cyanoethyl cellulose and nitrocellulose.

In some embodiments, the carboxylic acid nitrogenous organic molecule is one or more of the following structures:

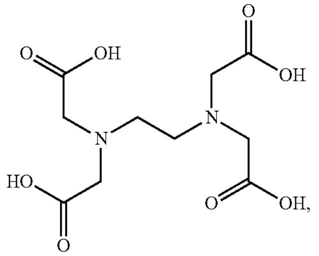

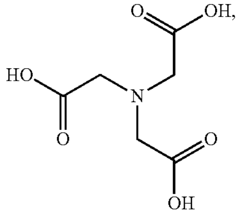

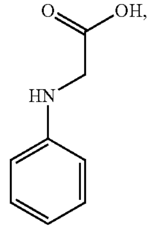

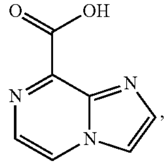

,

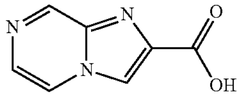

and

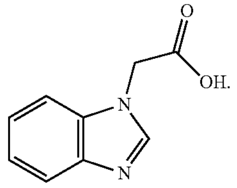

In some embodiments, the metal iodide is one or more selected from the group consisting of copper iodide, calcium iodide, magnesium iodide and barium iodide.

In some embodiments, the fatty alcohol is one or more selected from the group consisting of methanol, ethanol, isopropanol, n-butanol, n-heptanol and n-octanol.

In some embodiments, in step 1), a dosage ratio of iodine, the carboxylic acid nitrogenous organic molecule, the metal iodide, the cellulose suspending agent, the fatty alcohol, deionized water and the solvent is 2.0-4.5 g:3.0-5.3 g:1.2-4.5 g:3.0-5.0 g:3.6-8.4 mL:0.2-1.5 g:45-70 mL.

In some embodiments, the carboxylic acid nitrogenous organic molecule is imidazo[1,2-A] pyrazine-2-carboxylic acid.

In some embodiments, the metal iodide is calcium iodide.

In some embodiments, the cellulose suspending agent is cyanoethyl cellulose.

In some embodiments, the fatty alcohol is n-butanol.

In some embodiments, the dosage ratio of iodine, imidazo [1,2-A] pyrazine-2-carboxylic acid, calcium iodide, cyanoethyl cellulose, n-butanol, deionized water and ethyl alcohol is 3.8 g:3.26 g:2.93 g:2.93 g:5 mL:0.2 g:65 mL.

In some embodiments, in step 1), the reaction is continued at 40-80° C. for 1-16 h.

In some embodiments, in step 1), the reaction is continued at 58° C. for 8 h.

In some embodiments, in step 2), the concentration of the electro-polarizable particle in the dispersion liquid of the electro-polarizable particle is 15%-30 wt %.

In some embodiments, in step 2), the concentration of the electro-polarizable particle in the dispersion liquid of the electro-polarizable particle is 20 wt %.

In a third aspect, the present application provides an electro-polarizable allochroic optical film, which adopts the following technical solution:

an electro-polarizable allochroic optical film, including above electro-polarizable particle or the electro-polarizable particle prepared by above preparation method for the electro-polarizable particle.

In some embodiments, the electro-polarizable allochroic optical film includes a substrate and a first conductive film, an electro-polarizable allochroic film and a second conductive film sequentially arranged on the substrate; the electro-polarizable allochroic film includes the electro-polarizable particle.

In some embodiments, the substrate is one or a combination of glass substrate, polyethylene terephthalate (PET) substrate and polymethyl methacrylate (PMMA) substrate.

In some embodiments, the first conductive film is one of indium tin oxide conductive film, silver nanowire conductive film, copper nanowire conductive film and zine oxide conductive film; the second conductive film is one of indium tin oxide conductive film, silver nanowire conductive film, copper nanowire conductive film and zine oxide conductive film.

In some embodiments, a preparation process for the electro-polarizable allochroic optical film includes the following steps:

a) mixing the dispersion liquid of the electro-polarizable particle with an oligomer, mixing uniformly by ultrasound, and rotary evaporating a solvent to obtain a emulsion A of the electro-polarizable particle and the oligomer;
b) adding a photo-curing initiator and an organic solvent to an UV crosslinked cured polymer, stirring uniformly, and rotary evaporating the organic solvent to obtain a liquid B;
c) mixing the emulsion A and the liquid B, stirring evenly and defoaming to obtain a coating slurry;
d) coating the coating slurry between the first conductive film and the second conductive film, and then performing photo curing to obtain the electro-polarizable allochroic optical film.

In some embodiments, in step a), the oligomer is one or two of poly iso-octyl methacrylate and poly decyl methacrylate.

In some embodiments, the viscosity of the poly iso-octyl methacrylate and poly decyl methacrylate is 500-10000 cps.

In some embodiments, the viscosity of the poly iso-octyl methacrylate and poly decyl methacrylate is 3000-5000 cps.

In some embodiments, in the emulsion A, a mass ratio of the electro-polarizable particle in the dispersion liquid of the electro-polarizable particle to the oligomer is 1:(2-50).

In some embodiments, in the emulsion A, the mass ratio of the electro-polarizable particle in the dispersion liquid of the electro-polarizable particle to the oligomer is 1:30.

In some embodiments, in step b), the UV crosslinked cured polymer is one or two of polyacrylate-polystyrene copolymer and polyacrylate-polysiloxane copolymer.

In some embodiments, the viscosity of the polyacrylate-polystyrene copolymer and polyacrylate-polysiloxane copolymer is 2000-20000 cps.

In some embodiments, the viscosity of the polyacrylate-polystyrene copolymer and polyacrylate-polysiloxane copolymer is 4000-12000 cps.

In some embodiments, the photo-curing initiator is 2,4,6-trimethylbenzoyl diphenyl phosphine oxide.

In some embodiments, the addition amount of the photo-curing initiator is 0.1%-3% by mass based on the UV crosslinked cured polymer.

In some embodiments, the addition amount of the photo-curing initiator is 1% by mass based on the UV crosslinked cured polymer.

In some embodiments, in step c), the emulsion A and the liquid B are mixed by a mass ratio of 1:(1-10).

In some embodiments, in step c), the emulsion A and the liquid B are mixed by the mass ratio of 1:5.

In some embodiments, the organic solvent is one or more selected from the group consisting of tetrahydrofuran, ethyl acetate, dichloromethane, acetone and dioxane.

In some embodiments, the electro-polarizable allochroic optical film can be processed by means of roller-roller, printing, bonding and extrusion.

In some embodiments, the film thickness of the electro-polarizable allochroic film is 50-150 μm.

In some embodiments, the film thickness of the electro-polarizable allochroic film is 95 μm.

To sum up, the present application can achieve at least one of the following beneficial technical effects:

1. the electro-polarizable particle according to the present application have fast response speed, wide color change range, and low haze, and are easy to be prepared in large area, and are suitable for large-scale practical applications;
2. the color change process of the electro-polarizable particle according to the present application after being electrified is a physical process, so it has better stability and is more conducive to practical application, compared with the oxidation-reduction allochroic principle of EC;
3. the electro-polarizable particle according to the present application prepared by only simple coordination reaction that has simple operation process, good experimental repeatability and is suitable for large-scale preparation;

4. the electro-polarizable particle prepared in the present application are applied to the preparation of electro-polarizable allochroic optical film; when being driven by voltage, the obtained electro-polarizable allochroic optical film has the advantages of wide adjustable transmittance range, low haze, fast response speed, etc.

DETAILED DESCRIPTION

The present application is further described in detail below in combination with FIGS. 1-6 and Examples.

Figure 3:
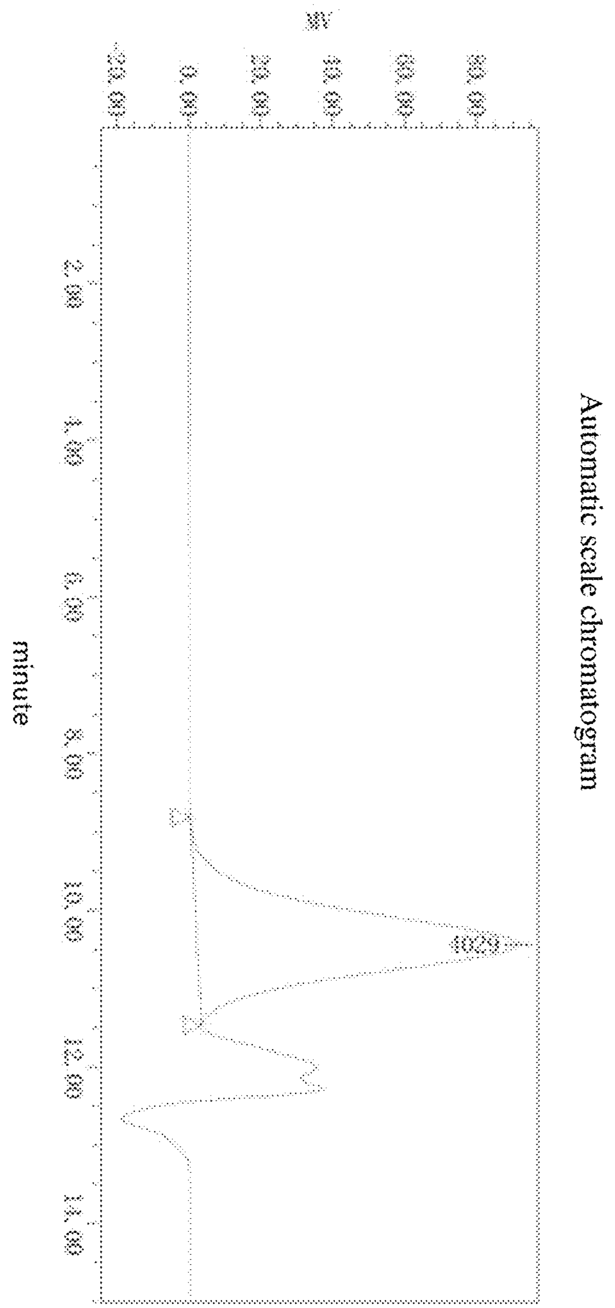
FIG. 3 is the molecular weight and its distribution diagram of poly iso-octyl methacrylate according to an Example of the present application.

An oligomer 4 (poly iso-octyl methacrylate and poly decyl methacrylate) and a UV crosslinked cured polymer 3 (polyacrylate-polystyrene copolymer and polyacrylate-polysiloxane copolymer) were used in the Examples of the present application. Their preparation methods were as follows:

A preparation method for poly iso-octyl methacrylate included the following steps: 19.8 g iso-octyl methacrylate (commercially available from Hubei Jusheng Technology Co., Ltd.) and 100 mL ethyl acetate were added into a 250 mL three necked flask. The three necked flask was purged with nitrogen for 15 min to remove the air. 2.6 mL 1-octyl mercaptan was added to the three necked flask, and the reaction temperature was raised to 65° C. rapidly. A solution of 246 mg/30 mL 2,2'-Azobis(2-methylpropionitrile) (AIBN) in ethyl acetate was added slowly to the three necked flask. The reaction was performed for 10 hours. The resultant was subjected to extraction, washing, rotary evaporation and distillation under reduced pressure to remove the low boiling point fraction, then the poly iso-octyl methacrylate was obtained. The viscosity was determined by a rotational viscometer as 4700 cps. FIG. 3 illustrates shows the molecular weight and its distribution of the prepared poly iso-octyl methacrylate.

Figure 4:
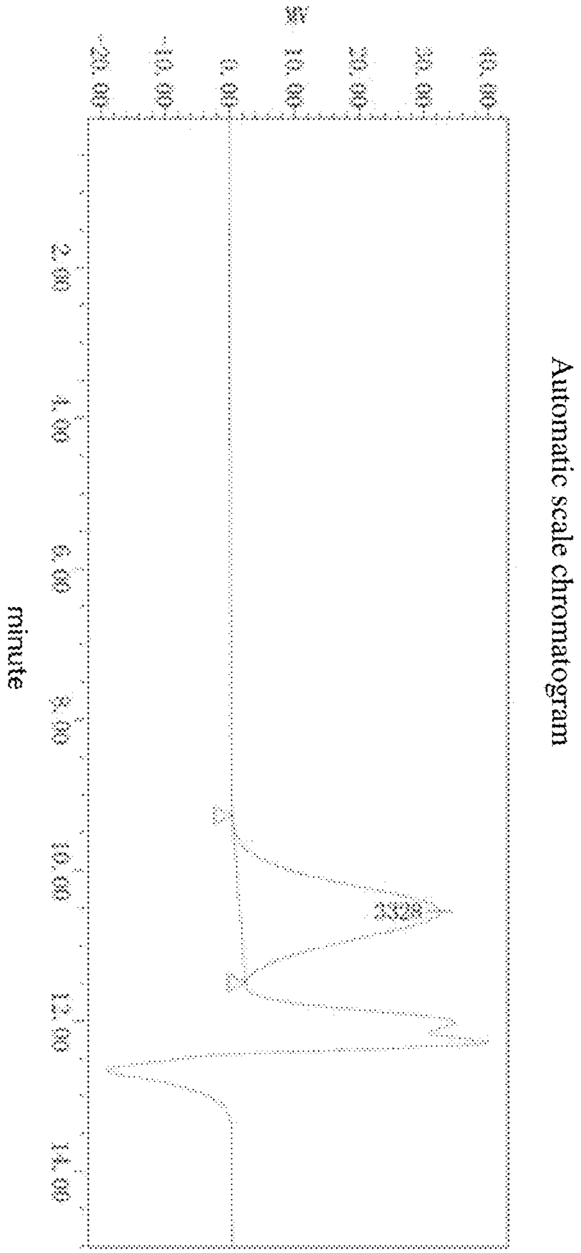
FIG. 4 is the molecular weight and its distribution diagram of Poly decyl methacrylate according to an Example of the present application.

A preparation method for poly decyl methacrylate included the following steps: 22.6 g decyl methacrylate (commercially available from Hubei jinleda Chemical Co., Ltd.) and 100 mL ethyl acetate were added into a 250 mL three necked flask. The three necked flask was purged with nitrogen for 15 min to remove oxygen. 4.2 mL 1-hexanethiol was added to the three necked flask, and the reaction temperature was raised to 65° C. rapidly. A solution of 328 mg/10 mL 2,2'-Azobis(2-methylpropionitrile) (AIBN) in ethyl acetate was added slowly to the three necked flask. The reaction was performed for 12 hours. The resultant was subjected to extraction, washing, rotary evaporation and distillation under reduced pressure to remove the low boiling point fraction, then the poly decyl methacrylate was obtained. The viscosity was determined by a rotational viscometer as 4100 cps. FIG. 4 shows the molecular weight and its distribution of the prepared poly decyl methacrylate.

Figure 5:
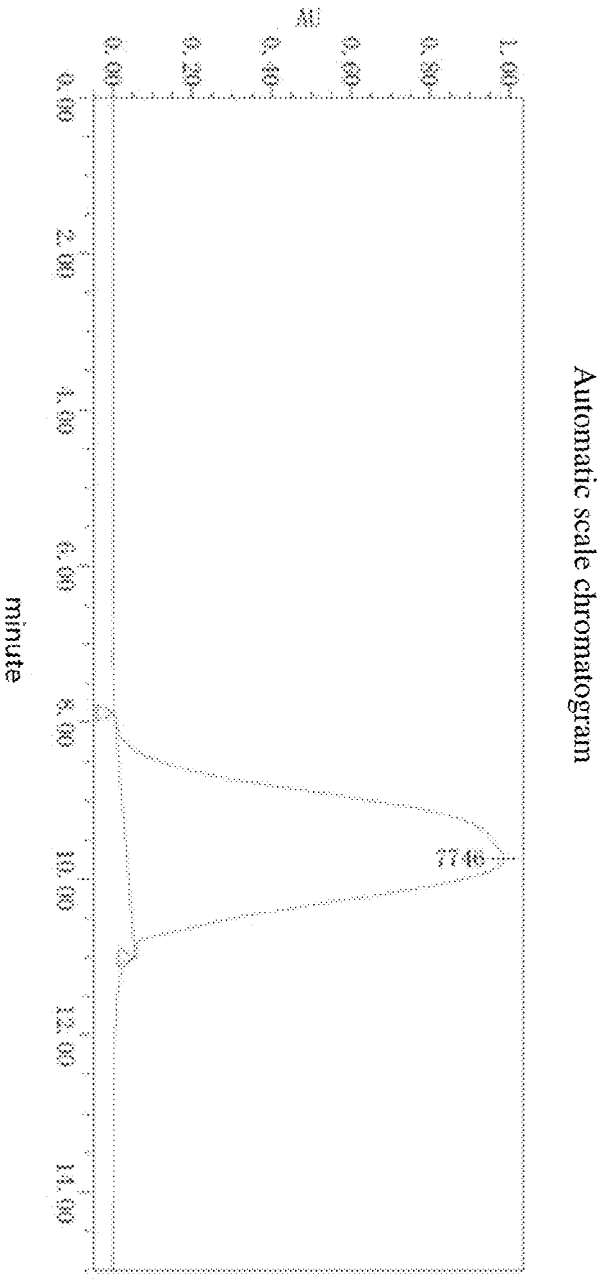
FIG. 5 is the molecular weight and its distribution diagram of polyacrylate-polystyrene copolymer according to an Example of the present application.

A preparation method for polyacrylate-polystyrene copolymer included the following steps: 156 g styrene (commercially available from Shanghai Aladdin Bio-chem Technology Co., Ltd.), 130 g 3-methacryloyloxypropylmethyldiethoxysilane (commercially available from Beijing HWRK Chem Co.) and 400 mL ethyl acetate were added into a 2 L three necked flask. The three necked flask was purged with nitrogen to remove oxygen, and the reaction temperature was raised until the solution began to backflow, then 3.28 g/50 mL 2,2'-Azobis (2-methylpropionitrile) (AIBN) ethyl acetate solution was slowly added to the three necked flask. The reaction was performed for 8 hours. The resultant was subjected to extraction, washing, rotary evaporation and vacuum distillation to remove the low boiling point fraction, then the polyacrylate-polystyrene copolymer was obtained. The viscosity was determined by a rotational viscometer as 12000 cps. FIG. 5 shows the molecular weight and its distribution of the prepared polyacrylate-polystyrene copolymer.

Figure 6:
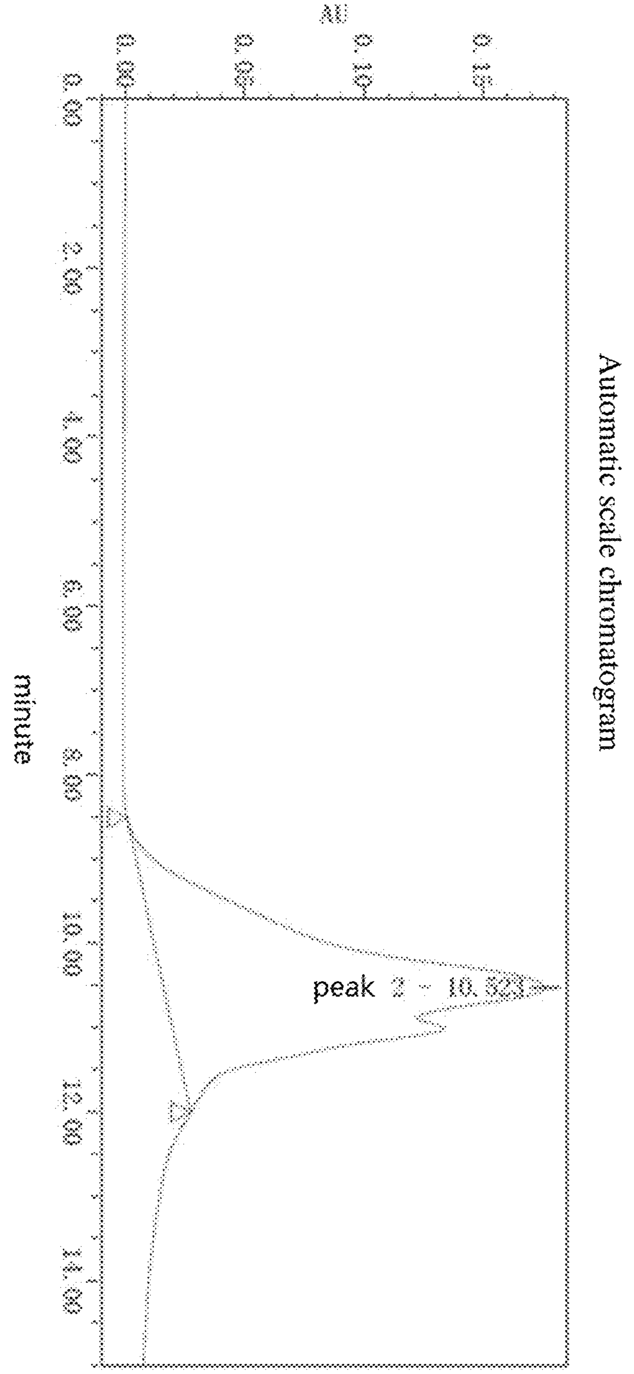
FIG. 6 is the molecular weight and its distribution diagram of polyacrylate-polysiloxane copolymer according to an Example of the present application.

A preparation method for polyacrylate-polysiloxane copolymer included the following steps: 128 g butyl acrylate (commercially available from Shanghai Aladdin Bio-chem Technology Co., Ltd.) and 117 g 3-methacryloyloxypropyl trimethoxysilane (commercially available from Hubei Jusheng Technology Co., Ltd.) were added to 1250 mL ethyl acetate, then 2.05 g 2,2'-Azobis(2-methylpropionitrile) (AIBN) was added, which was purged with nitrogen to remove oxygen. The reaction temperature was raised until the solution began to backflow. The reaction was performed for 4 hours. Then, the reaction temperature was decreased to 60° C. and 5.7 g triethylene glycol dimethacrylate (commercially available from Shanghai Macklin Biochemical Technology Co., Ltd.) was added for end capping reaction for 1 hour. The resultant was subjected to extraction, washing, rotary evaporation and vacuum distillation to remove the low boiling point fraction, then the polyacrylate-polysiloxane copolymer was obtained. The viscosity was determined by a rotational viscometer as 10500 cps. FIG. 6 shows the molecular weight and its distribution of the prepared polyacrylate-polysiloxane copolymer.

Since the structure of the electro-polarizable allochroic optical film in each Example of the present application is identical, the structure of the electro-polarizable allochroic optical film was described first.

Figure 1:
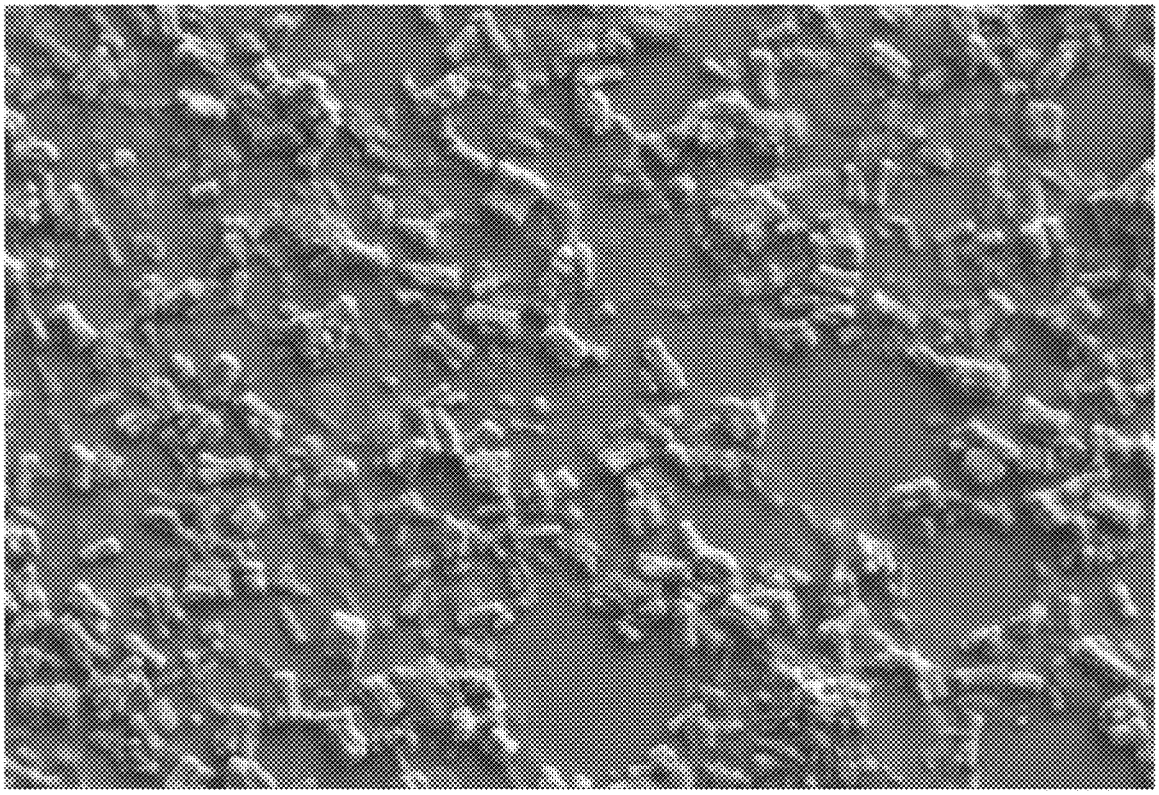
FIG. 1 is a scanning electron microscope graphic of the electro-polarizable particle nanorod according to Example 8 of the present application.
Figure 2:
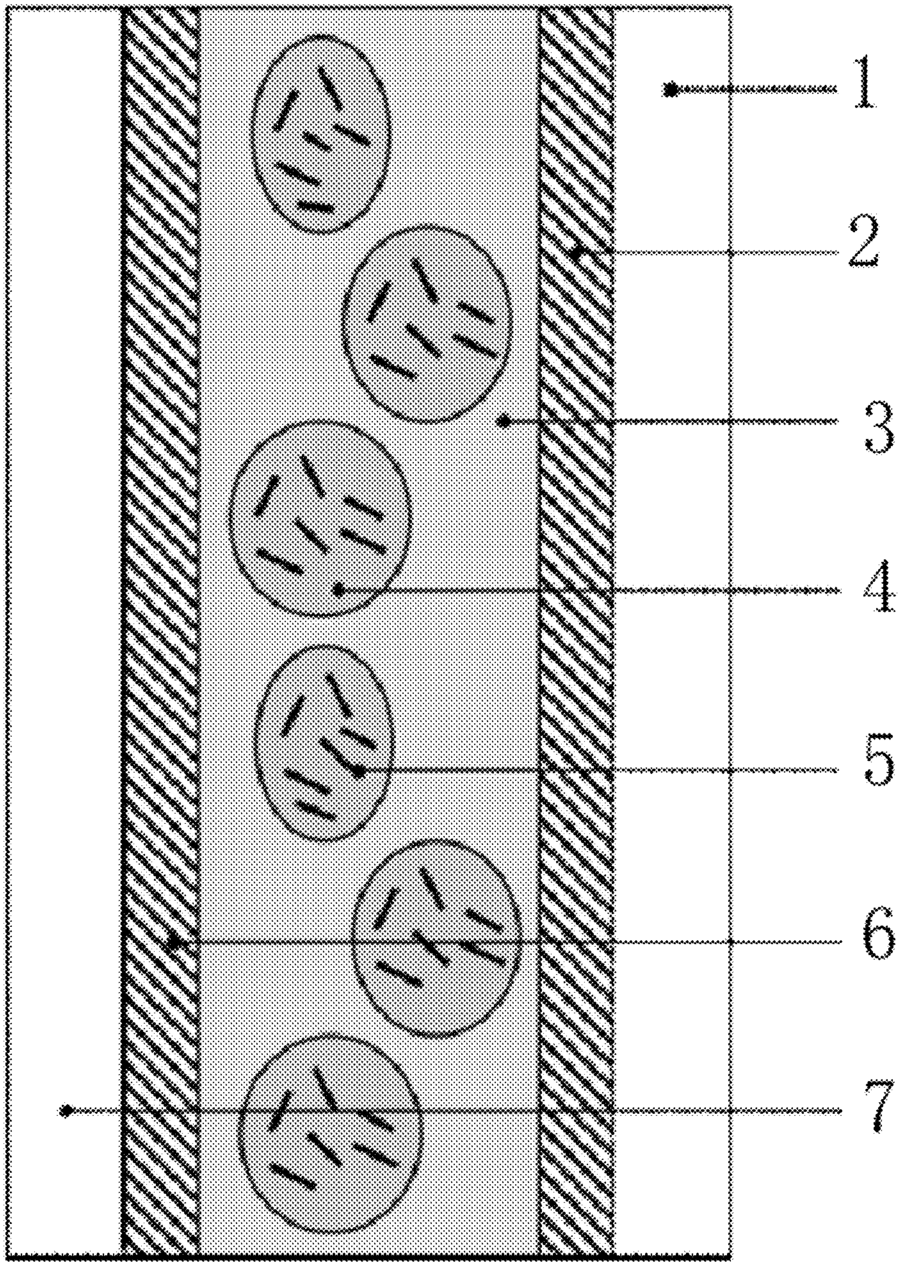
FIG. 2 is a structural schematic diagram of an electro-polarizable allochroic optical film according to an Example of the present application.

Referring to FIG. 2, the electro-polarizable allochroic optical film included a substrate 7, a first conductive film 6, an electro-polarizable allochroic film, a second conductive film 2 and a protective film 1 arranged in sequence. PET film was selected for the substrate 7, indium tin oxide (ITO) conductive film was selected for the first conductive film 6. The electro-polarizable allochroic film included the electro-polarizable particle 5, the oligomer 4 and the UV crosslinked cured polymer 3. Indium tin oxide (ITO) conductive film was selected for the second conductive film 2, PET film was selected for the protective film 1.

Example 1

The example discloses a preparation method for an electro-polarizable particle, which includes the following steps:

1) 1.8 g ethyl cellulose and 50 mL ethyl acetate were added into a 100 mL three necked flask under sufficient stirring, such that ethyl cellulose was completely dissolved in ethyl acetate. The reaction temperature was raised to 60° C., and then 3.8 g iodine, 2.92 g ethylene diamine tetraacetic acid (the structural formula is shown below, commercially available from Shanghai Aladdin Bio-chem Technology Co., Ltd.), 1.9 g anhydrous copper iodide, 4 mL methanol and 0.1 g deionized water were added successively. The reaction was performed at 60° C. for 16 h.

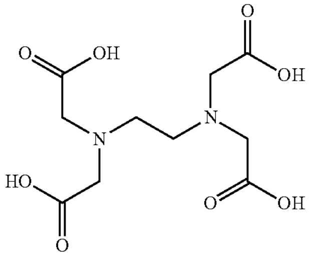 [SMILES: O=C(O)CN(CCN(CC(=O)O)CC(=O)O)CC(=O)O]

2) The resultant was centrifuged at 12000 r for 60 min, and the supernatant liquid was removed. The solid at the bottom of the centrifuge bottle was washed into a glass bottle by ethyl acetate, and is ultrasonically dispersed in ethyl acetate. Centrifugation was continued. Above operations of centrifugation, washing, and ultrasonic dispersion were repeated for 3 times. Finally, the precipitate was washed and dispersed into ethyl acetate to obtain the dispersion liquid of the electro-polarizable particle 5, and the concentration of the electro-polarizable particle 5 was 20 wt %.

The example further discloses an electro-polarizable allochroic optical film. The preparation process for the electro-polarizable allochroic optical film includes the following steps:

a) the electro-polarizable particle 5 in the dispersion liquid of the electro-polarizable particle 5 was mixed uniformly with the oligomer 4 poly isooctyl methacrylate by a mass ratio of 1:25 by ultrasound. The solvent was removed by rotary evaporation to obtain the emulsion A of the electro-polarizable particle 5 and isooctyl methacrylate.

b) 2,4,6-trimethylbenzoyl diphenyl phosphine oxide UV curing initiator with a mass fraction of 0.8% (commercially available from Shanghai McLean Biochemical Technology Co., Ltd.) was added to the UV crosslinked cured polymer 3 polyacrylate-polystyrene copolymer, and tetrahydrofuran was added. The obtained mixture was mixed uniformly by ultrasound, and then was charged into a rotary evaporator to remove the organic solvent, then the liquid B was obtained.

c) The emulsion A and the liquid B were mixed by a mass ratio of 1:6, stirred uniformly and defoamed in vacuum to obtain the coating slurry.

d) The coating slurry is coated and bonded between two indium tin oxide (ITO) conductive films by roll to roll coating method. The thickness of the obtained electro-polarizable allochroic film was adjusted by controlling the spacing between the two rolls. After being cured under an UV curing lamp for 90 s, the electro-polarizable allochroic optical film with the electro-polarizable allochroic film having a thickness of 105 μm was obtained.

Example 2

The example discloses a preparation method for an electro-polarizable particle, which includes the following steps:

1) 1.62 g ethyl cellulose and 60 mL ethyl acetate were added into a 100 mL three necked flask under sufficient stirring, such that ethyl cellulose was completely dissolved in ethyl acetate. The reaction temperature was raised to 65° C., and then 2.54 g iodine, 1.9 g nitrilotriacetic acid (the structural formula is shown below, commercially available from Nanjing Bono Biotechnology Co., Ltd.), 1.9 g anhydrous copper iodide, 5 mL ethanol and 0.2 g deionized water were added successively. The reaction was performed at 65° C. for 12 h.

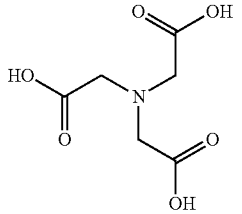 [SMILES: O=C(O)CN(CC(=O)O)CC(=O)O]

2) The resultant was centrifuged at 12000 r for 40 min, and the supernatant liquid was removed. The solid at the bottom of the centrifuge bottle was washed into a glass bottle by ethyl acetate, and was ultrasonically dispersed in ethyl acetate. Centrifugation was continued. Above operations of centrifugation, washing, and ultrasonic dispersion were repeated for 3 times. Finally, the precipitate was washed and ultrasonically dispersed into ethyl acetate to obtain the dispersion liquid of the electro-polarizable particle 5, and the concentration of the electro-polarizable particle 5 was 25 wt %.

The example further discloses an electro-polarizable allochroic optical film. The preparation process for the electro-polarizable allochroic optical film includes the following steps:

a) the electro-polarizable particle 5 in the dispersion liquid of the electro-polarizable particle 5 was mixed uniformly with the oligomer 4 poly isooctyl methacrylate by a mass ratio of 1:30 by ultrasound. The solvent was removed by rotary evaporation to obtain the emulsion A of the electro-polarizable particle 5 and the oligomer 4.

b) 2,4,6-trimethylbenzoyl diphenyl phosphine oxide UV curing initiator with a mass fraction of 1% was added to the UV crosslinked cured polymer 3 polyacrylate-polystyrene copolymer, and tetrahydrofuran was added. The obtained mixture was mixed uniformly by ultrasound, and then was charged into a rotary evaporator to remove the organic solvent, then the liquid B was obtained.

c) The emulsion A and the liquid B were mixed by a mass ratio of 1:6, stirred uniformly and defoamed in vacuum to obtain the coating slurry.

d) The coating slurry is coated and bonded between two indium tin oxide (ITO) conductive films by roll to roll coating method. The thickness of the obtained electro-polarizable allochroic film was adjusted by controlling the spacing between the two rolls. After being cured under an UV curing lamp for 90 s, the electro-polarizable allochroic optical film with the electro-polarizable allochroic film having a thickness of 98 μm was obtained.

Example 3

The example discloses a preparation method for an electro-polarizable particle, which includes the following steps:

1) 2.16 g cyanoethyl cellulose and 60 mL ethyl acetate were added into a 100 mL three necked flask under sufficient stirring, such that cyanoethyl cellulose was completely dissolved in ethyl acetate. The reaction temperature was raised to 65° C., and then 3.8 g iodine, 3.02 g anilinoacetic acid (the structural formula is shown below, commercially available from Beijing bailingwei Technology Co., Ltd.), 3.91 g anhydrous barium iodide, 5 mL ethanol and 0.2 g deionized water were added successively. The reaction was performed at 65° C. for 12 h.

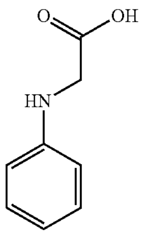 [SMILES: O=C(O)CNc1ccccc1]

2) The resultant was centrifuged at 12000 r for 40 min, and the supernatant liquid was removed. The solid at the bottom of the centrifuge bottle was washed into a glass bottle by ethyl acetate, and was ultrasonically dispersed in ethyl acetate. Centrifugation was continued. Above operations of centrifugation, washing, and ultrasonic dispersion were repeated for 3 times. Finally, the precipitate was washed and ultrasonically dispersed into ethyl acetate to obtain the dispersion liquid of the electro-polarizable particle 5, and the concentration of the electro-polarizable particle 5 was 22 wt %.

The example further discloses an electro-polarizable allochroic optical film. The preparation process for the electro-polarizable allochroic optical film includes the following steps:

a) the electro-polarizable particle 5 in the dispersion liquid of the electro-polarizable particle 5 was mixed uniformly with the oligomer 4 poly decyl methacrylate by a mass ratio of 1:30 by ultrasound. The solvent was removed by rotary evaporation to obtain the emulsion A of the electro-polarizable particle 5 and the oligomer 4.

b) 2,4,6-trimethylbenzoyl diphenyl phosphine oxide UV curing initiator with a mass fraction of 0.9% was added to the UV crosslinked cured polymer 3 polyacrylate-polystyrene copolymer, and tetrahydrofuran was added. The obtained mixture was mixed uniformly by ultrasound, and then was charged into a rotary evaporator to remove the organic solvent, then the liquid B was obtained.

c) The emulsion A and the liquid B were mixed by a mass ratio of 1:6, stirred uniformly and defoamed in vacuum to obtain the coating slurry.

d) The coating slurry is coated and bonded between two indium tin oxide (ITO) conductive films by roll to roll coating method. The thickness of the obtained electro-polarizable allochroic film was adjusted by controlling the spacing between the two rolls. After being cured under an UV curing lamp for 120 s, the electro-polarizable allochroic optical film with the electro-polarizable allochroic film having a thickness of 98 μm was obtained.

Example 4

The example discloses a preparation method for an electro-polarizable particle, which includes the following steps:

1) 2.43 g ethyl cellulose and 60 mL ethyl acetate were added into a 100 mL three necked flask under sufficient stirring, such that ethyl cellulose was completely dissolved in ethyl acetate. The reaction temperature was raised to 65° C., and then 3.8 g iodine, 2.45 g indole-[1,2-A]-pyrazine-8-carboxylic acid (the structural formula is shown below, commercially available from Shanghai Haohong Biomedical Technology Co., Ltd.), 2.78 g anhydrous magnesium iodide, 5 mL n-butanol and 0.3 g deionized water were added successively. The reaction was performed at 65° C. for 12 h.

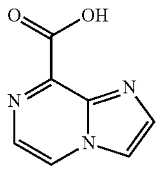 [SMILES: O=C(O)c1nccn2ccnc12]

2) The resultant was centrifuged at 12000 r for 40 min, and the supernatant liquid was removed. The solid at the bottom of the centrifuge bottle was washed into a glass bottle by ethyl acetate, and was ultrasonically dispersed in ethyl acetate. Centrifugation was continued. Above operations of centrifugation, washing, and ultrasonic dispersion were repeated for 3 times. Finally, the precipitate was washed and ultrasonically dispersed into ethyl acetate to obtain the dispersion liquid of the electro-polarizable particle 5, and the concentration of the electro-polarizable particle 5 was 22 wt %.

The example further discloses an electro-polarizable allochroic optical film. The preparation process for the electro-polarizable allochroic optical film includes the following steps:

a) the electro-polarizable particle 5 in the dispersion liquid of the electro-polarizable particle 5 was mixed uniformly with the oligomer 4 poly decyl methacrylate by a mass ratio of 1:35 by ultrasound. The solvent was removed by rotary evaporation to obtain the emulsion A of the electro-polarizable particle 5 and the oligomer 4.

b) 2,4,6-trimethylbenzoyl diphenyl phosphine oxide UV curing initiator with a mass fraction of 0.8% was added to the UV crosslinked cured polymer 3 polyacrylate-polysiloxane copolymer, and tetrahydrofuran was added. The obtained mixture was mixed uniformly by ultrasound, and then was charged into a rotary evaporator to remove the organic solvent, then the liquid B was obtained.

c) The emulsion A and the liquid B were mixed by a mass ratio of 1:5, stirred uniformly and defoamed in vacuum to obtain the coating slurry.

d) The coating slurry is coated and bonded between two indium tin oxide (ITO) conductive films by roll to roll coating method. The thickness of the obtained electro-polarizable allochroic film was adjusted by controlling the spacing between the two rolls. After being cured under an UV curing lamp for 120 s, the electro-polarizable allochroic optical film with the electro-polarizable allochroic film having a thickness of 101 μm was obtained.

Example 5

The example discloses a preparation method for an electro-polarizable particle, which includes the following steps:

1) 2.93 g nitrocellulose and 65 mL ethyl acetate were added successively into a 100 mL three necked flask under sufficient stirring, such that nitrocellulose was completely dissolved in ethyl acetate. The reaction temperature was raised to 58° C., and then 4.75 g iodine, 3.26 g imidazo[1,2-A]pyrazine-2-carboxylic acid (the structural formula is shown below, commercially available from Shanghai bide Pharmaceutical Technology Co., Ltd.), 2.2 g anhydrous calcium iodide, 4.5 mL n-butanol and 0.3 g deionized water were added successively. The reaction was performed at 58° C. for 11 h.

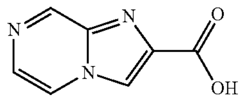 [SMILES: O=C(O)c1cn2ccncc2n1]

2) The resultant was centrifuged at 12000 r for 40 min, and the supernatant liquid was removed. The solid at the bottom of the centrifuge bottle was washed into a glass bottle by ethyl acetate, and was ultrasonically dispersed in ethyl acetate. Centrifugation was continued. Above operations of centrifugation, washing, and ultrasonic dispersion were repeated for 3 times. Finally, the precipitate was washed and ultrasonically dispersed into ethyl acetate to obtain the dispersion liquid of the electro-polarizable particle 5, and the concentration of the electro-polarizable particle 5 was 25 wt %.

The example further discloses an electro-polarizable allochroic optical film. The preparation process for the electro-polarizable allochroic optical film includes the following steps:

a) the electro-polarizable particle 5 in the dispersion liquid of the electro-polarizable particle 5 was mixed uniformly with the oligomer 4 Poly decyl methacrylate by a mass ratio of 1:40 by ultrasound. The solvent was removed by rotary evaporation to obtain the emulsion A of the electro-polarizable particle 5 and the oligomer 4.

b) 2,4,6-trimethylbenzoyl diphenyl phosphine oxide UV curing initiator with a mass fraction of 1.1% (commercially available from Shanghai McLean Biochemical Technology Co., Ltd.) was added to the UV crosslinked cured polymer 3 polyacrylate-polysiloxane copolymer, and tetrahydrofuran was added. The obtained mixture was mixed uniformly by ultrasound, and then was charged into a rotary evaporator to remove the organic solvent, then the liquid B was obtained.

c) The emulsion A and the liquid B were mixed by a mass ratio of 1:5, stirred uniformly and defoamed in vacuum to obtain the coating slurry.

d) The coating slurry is coated and bonded between two indium tin oxide (ITO) conductive films by roll to roll coating method. The thickness of the obtained electro-polarizable allochroic film was adjusted by controlling the spacing between the two rolls. After being cured under an UV curing lamp for 120 s, the electro-polarizable allochroic optical film with the electro-polarizable allochroic film having a thickness of 100 μm was obtained.

Example 6

The example discloses a preparation method for an electro-polarizable particle, which includes the following steps:

1) 2.93 g cyanoethyl cellulose and 65 mL ethyl acetate were added into a 100 mL three necked flask under sufficient stirring, such that cyanoethyl cellulose was completely dissolved in ethyl acetate. The reaction temperature was raised to 68° C., and then 3.8 g iodine, 2.64 g benzimidazole-1-acetic acid (the structural formula is shown below, commercially available from Shanghai Haohong Biomedical Technology Co., Ltd.), 2.93 g anhydrous calcium iodide, 4.5 mL isopropyl alcohol and 0.2 g deionized water were added successively. The reaction was performed at 68° C. for 10 h.

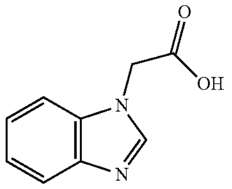 [SMILES: O=C(O)Cn1cnc2ccccc21]

2) The resultant was centrifuged at 12000 r for 40 min, and the supernatant liquid was removed. The solid at the bottom of the centrifuge bottle was washed into a glass bottle by ethyl acetate, and was ultrasonically dispersed in ethyl acetate. Centrifugation was continued. Above operations of centrifugation, washing, and ultrasonic dispersion were repeated for 3 times. Finally, the precipitate was washed and ultrasonically dispersed into ethyl acetate to obtain the dispersion liquid of the electro-polarizable particle 5, and the concentration of the electro-polarizable particle 5 was 25 wt %.

The example further discloses an electro-polarizable allochroic optical film. The preparation process for the electro-polarizable allochroic optical film includes the following steps:

a) the electro-polarizable particle 5 in the dispersion liquid of the electro-polarizable particle 5 was mixed uniformly with the oligomer 4 poly decyl methacrylate by a mass ratio of 1:30 by ultrasound. The solvent was removed by rotary evaporation to obtain the emulsion A of the electro-polarizable particle 5 and the oligomer 4.

b) 2,4,6-trimethylbenzoyl diphenyl phosphine oxide UV curing initiator with a mass fraction of 0.9% was added to the UV crosslinked cured polymer 3 polyacrylate-polysiloxane copolymer, and tetrahydrofuran was added. The obtained mixture was mixed uniformly by ultrasound, and then was charged into a rotary evaporator to remove the organic solvent, then the liquid B was obtained.

c) The emulsion A and the liquid B were mixed by a mass ratio of 1:6, stirred uniformly and defoamed in vacuum to obtain the coating slurry.

d) The coating slurry is coated and bonded between two indium tin oxide (ITO) conductive films by roll to roll coating method. The thickness of the obtained electro-polarizable allochroic film was adjusted by controlling the spacing between the two rolls. After being cured under an UV curing lamp for 120 s, the electro-polarizable allochroic optical film with the electro-polarizable allochroic film having a thickness of 95 μm was obtained.

Example 7

The example discloses a preparation method for an electro-polarizable particle, which includes the following steps:

1) 2.71 g cyanoethyl cellulose and 60 mL ethyl acetate were added into a 100 mL three necked flask under sufficient stirring, such that cyanoethyl cellulose was completely dissolved in ethyl acetate. The reaction temperature was raised to 58° C., and then 3.8 g iodine, 3.26 g imidazo [1,2-A] pyrazine-2-carboxylic acid were added successively. After being stirred for 2 h, 2.2 g anhydrous calcium iodide, 4.5 mL n-butanol and 0.1 g deionized water were added. The reaction was performed at 58° C. for 8 h.
2) The resultant was centrifuged at 12000 r for 40 min, and the supernatant liquid was removed. The solid at the bottom of the centrifuge bottle was washed into a glass bottle by ethyl acetate, was ultrasonically dispersed in ethyl acetate, and then was centrifuged at 1000 r for 40 min. Then the supernatant liquid was separated and centrifuged at 10000 r for 1 h, after which the resultant supernatant liquid was removed. Finally, the precipitate was washed and ultrasonically dispersed into ethyl acetate to obtain the dispersion liquid of the electro-polarizable particle 5, and the concentration of the electro-polarizable particle 5 was 20 wt %.

The example further discloses an electro-polarizable allochroic optical film. The preparation process for the electro-polarizable allochroic optical film includes the following steps:

a) the electro-polarizable particle 5 in the dispersion liquid of the electro-polarizable particle 5 was mixed uniformly with the oligomer 4 poly decyl methacrylate by a mass ratio of 1:30 by ultrasound. The solvent was removed by rotary evaporation to obtain the emulsion A of the electro-polarizable particle 5 and the oligomer 4.
b) 2,4,6-trimethylbenzoyl diphenyl phosphine oxide UV curing initiator with a mass fraction of 1% was added to the UV crosslinked cured polymer 3 polyacrylate-polysiloxane copolymer, and tetrahydrofuran was added. The obtained mixture was mixed uniformly by ultrasound, and then was charged into a rotary evaporator to remove the organic solvent, then the liquid B was obtained.
c) The emulsion A and the liquid B were mixed by a mass ratio of 1:5, stirred uniformly and defoamed in vacuum to obtain the coating slurry.
d) The coating slurry is coated and bonded between two indium tin oxide (ITO) conductive films by roll to roll coating method. The thickness of the obtained electro-polarizable allochroic film was adjusted by controlling the spacing between the two rolls. After being cured under an UV curing lamp for 120 s, the electro-polarizable allochroic optical film with the electro-polarizable allochroic film having a thickness of 93 μm was obtained.

Example 8

The example discloses a preparation method for an electro-polarizable particle, which includes the following steps:

1) 2.93 g cyanoethyl cellulose and 65 mL ethyl acetate were added into a 100 mL three necked flask under sufficient stirring, such that cyanoethyl cellulose was completely dissolved in ethyl acetate. The reaction temperature was raised to 58° C., and then 3.8 g iodine, 2.93 g anhydrous calcium iodide and 5 mL n-butanol were added successively. After being stirred for 2 h, 3.26 g imidazo [1,2-A] pyrazine-2-carboxylic acid and 0.2 g deionized water were added. The reaction was performed at 58° C. for 8 h.
2) The resultant was centrifuged at 12000 r for 40 min, and the supernatant liquid was removed. The solid at the bottom of the centrifuge bottle was washed into a glass bottle by ethyl acetate, was ultrasonically dispersed in ethyl acetate, and then was centrifuged at 2000 r for 40 min. Then the supernatant liquid was separated and centrifuged at 10000 r for 1 h, after which the resultant supernatant liquid was removed. Finally, the precipitate was washed and ultrasonically dispersed into ethyl acetate to obtain the dispersion liquid of the electro-polarizable particle 5 and the concentration of the electro-polarizable particle 5 was 20 wt %.

The example further discloses an electro-polarizable allochroic optical film. The preparation process for the electro-polarizable allochroic optical film includes the following steps:

a) the electro-polarizable particle 5 in the dispersion liquid of the electro-polarizable particle 5 was mixed uniformly with the oligomer 4 poly decyl methacrylate in a mass ratio of 1:30 by ultrasound. The solvent was removed by rotary evaporation to obtain the emulsion A of the electro-polarizable particle 5 and the oligomer 4 poly decyl methacrylate.
b) 2,4,6-trimethylbenzoyl diphenyl phosphine oxide UV curing initiator with a mass fraction of 1% was added to the UV crosslinked cured polymer 3 polyacrylate-polysiloxane copolymer, and tetrahydrofuran was added. The obtained mixture was mixed uniformly by ultrasound, and then was charged into a rotary evaporator to remove the organic solvent, then the liquid B was obtained.
c) The emulsion A and the liquid B were mixed by a mass ratio of 1:5, stirred uniformly and defoamed in vacuum to obtain the coating slurry.
d) The coating slurry is coated and bonded between two indium tin oxide (ITO) conductive films by roll to roll coating method. The thickness of the obtained electro-polarizable allochroic film was adjusted by controlling the spacing between the two rolls. After being cured under an UV curing lamp for 120 s, the thickness of the electro-polarizable allochroic optical film is 95 μm. Then the performances of the optical film were tested after contacting the electrodes.

Performance Test Methods and Test Data

The visible light transmittance and haze performance of the electro-polarizable allochroic optical film in energized and de-energized states were determined by adopting Th-100 transmittance Haze Meter (Hangzhou Caipu Technology Co., Ltd.), with a test range of 400 nm to 700 nm. An AC power supply with a frequency of 50 Hz and an adjustable voltage range of 0-220V is used to drive the electro-polarizable optical film. The performance test results of the optical films prepared in examples 1-8 are shown in Table 1.

Table 1 performance test results of electro-polarizable allochroic optical film

| Samples | Film thickness(μm) | Transmittance in de-energized state (T %) | Transmittance in energized state of 110 V (T %) | Haze in de-energized state (Haze %) | Haze in energized state of 110 V (Haze %) |
|---|---|---|---|---|---|
| Example 1 | 105 | 2.67 | 40.9 | 100 | 10.3 |
| Example 2 | 103 | 2.23 | 43.2 | 53.5 | 8.51 |
| Example 3 | 98 | 2.50 | 44.1 | 52.3 | 7.92 |
| Example 4 | 101 | 1.94 | 49.0 | 53.2 | 7.65 |
| Example 5 | 100 | 1.89 | 54.8 | 39.5 | 7.84 |
| Example 6 | 95 | 2.3 | 57.1 | 35.4 | 6.50 |
| Example 7 | 93 | 3.10 | 58.3 | 36.8 | 4.25 |
| Example 8 | 95 | 2.52 | 60.5 | 32.7 | 2.87 |

Conclusion

It can be seen from the test results that the electro-polarizable allochroic optical films with different transmittance and haze can be achieved by changing the preparation process and post-treatment method of electro-polarizable particle. In examples 1-6, the electro-polarizable allochroic films with different transmittance properties can be obtained by changing the types, the proportions and the addition order of reactants; the electro-polarizable allochroic optical film with lower haze in the open state can be obtained by adjusting the centrifugal treating process of electro-polarizable particle. As described in Example 8, the electro-polarizable allochroic optical film prepared by coating the coating slurry containing the prepared electro-polarizable particle has the best transmittance (2.52%-60.5%) and the lowest haze (2.87%) in energized state, when the dosage ratio of iodine, imidazolo [1,2-A] pyrazine-2-carboxylic acid, calcium iodide, cyanoethyl cellulose, n-butanol, deionized water and ethyl acetate is 3.8 g:3.26 g:2.93 g:2.93 g:5 mL:0.2 g:65 mL, and 2000 r-10000 r is used to grade the particle size of the electro-polarizable particle.

The above examples are only preferred examples of the present application and does not limit the present application in any form. Any simple modification, equivalent change or modification to the above examples according to the technical principle of the present application still fall into the scope of the technical solution of the present application.

What is claimed is:

1. An electro-polarizable allochroic optical film, comprising an electro-polarizable particle; the electro-polarizable particle comprising a metal iodide, a carboxylic acid nitrogenous organic molecule, iodine and a cellulose suspending agent; wherein the electro-polarizable particle has a rod-shaped structure, a length of 100-2000 nm, and a width of 10-200 nm; wherein the carboxylic acid nitrogenous organic molecule is one or more selected from the group consisting of:

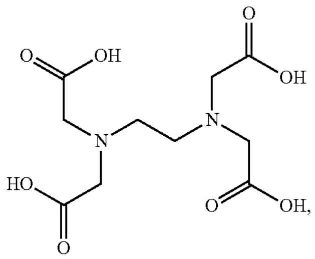

-continued

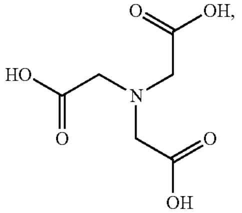

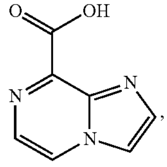

,

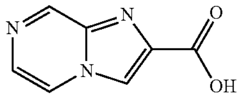

and

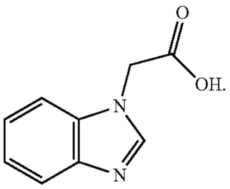

2. The electro-polarizable allochroic optical film according to claim 1, wherein the electro-polarizable allochroic optical film comprises a substrate and a first conductive film, an electro-polarizable allochroic film and a second conductive film sequentially arranged on the substrate; and the electro-polarizable allochroic film comprises the electro-polarizable particle.

3. The electro-polarizable allochroic optical film according to claim 2, wherein the first conductive film is one selected from the group consisting of indium tin oxide conductive film, silver nanowire conductive film, copper nanowire conductive film and zine oxide conductive film; and the second conductive film is one selected from the group consisting of indium tin oxide conductive film, silver nanowire conductive film, copper nanowire conductive film and zine oxide conductive film.

4. The electro-polarizable allochroic optical film according to claim 3, wherein a preparation process for the electro-polarizable allochroic optical film comprises the following steps:

a) mixing the electro-polarizable particle in a dispersion liquid of the electro-polarizable particle with an oligomer uniformly by ultrasound, and rotary evaporating a solvent to obtain an emulsion of the electro-polarizable particle and the oligomer;

b) adding a photo-curing initiator and an organic solvent to an ultraviolet (UV) crosslinked cured polymer, stirring uniformly, and rotary evaporating the organic solvent to obtain a liquid;

c) mixing the emulsion and the liquid, stirring uniformly and defoaming under vacuum to obtain a coating slurry; and d) coating the coating slurry between the first conductive film and the second conductive film, and then performing photo curing to obtain the electro-polarizable allochroic optical film;

wherein a preparation method for the electro-polarizable particle comprises the following steps:

1) adding the cellulose suspending agent to the solvent under stirring, raising a reaction temperature to 25-80° C., successively adding the iodine, the carboxylic acid nitrogenous organic molecule, the metal iodide, a fatty alcohol, and deionized water, and keeping reacting at 25-80° C. for 1-20 h; and 2) centrifuging and washing a resultant obtained in the step 1), and dispersing a precipitate into the solvent to obtain the dispersion liquid of the electro-polarizable particle.

5. The electro-polarizable allochroic optical film according to claim 4, wherein the oligomer is one or two of poly iso-octyl methacrylate and poly decyl methacrylate;

a viscosity of the poly iso-octyl methacrylate and the poly decyl methacrylate is 500-10000 cps; and in the emulsion, a mass ratio of the electro-polarizable particle in the dispersion liquid of the electro-polarizable particle to the oligomer is 1:(2-50).

6. The electro-polarizable allochroic optical film according to claim 5, wherein in the step b), the UV crosslinked cured polymer is one or two of polyacrylate-polystyrene copolymer and polyacrylate-polysiloxane copolymer;

a viscosity of the polyacrylate-polystyrene copolymer and the polyacrylate-polysiloxane copolymer is 2000-20000 cps;

the photo-curing initiator is 2,4,6-trimethylbenzoyl diphenyl phosphine oxide; and an addition amount of the photo-curing initiator is 0.1%-3% by mass based on the UV crosslinked cured polymer.

7. The electro-polarizable allochroic optical film according to claim 5, wherein in the step c), the emulsion and the liquid are mixed by a mass ratio of 1:(1-10); and the organic solvent is one or more selected from the group consisting of tetrahydrofuran, ethyl acetate, dichloromethane, acetone and dioxane.

* * * * *